Aug. 12, 1952  J. PAYTON  2,606,552
UTERUS RETAINING TRUSS AND HARNESSING MEANS THEREFOR
Filed July 23, 1951
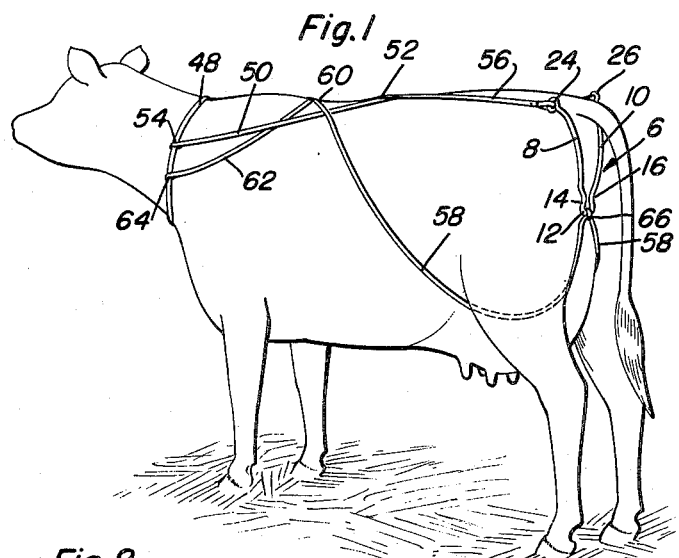
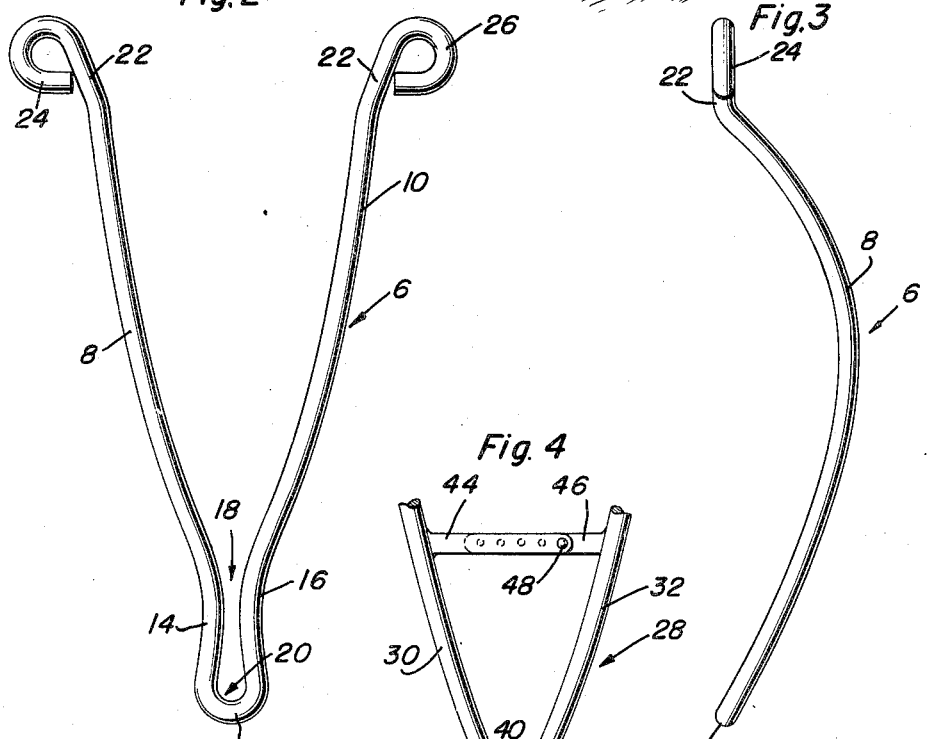
Jerome Payton
INVENTOR.

Patented Aug. 12, 1952

2,606,552

UNITED STATES PATENT OFFICE 2,606,552

UTERUS RETAINING TRUSS AND HARNESSING MEANS THEREFOR

Jerome Payton, Morris, N. Y.

Application July 23, 1951, Serial No. 238,152

4 Claims. (Cl. 128—98)

1

The present invention relates to a specially constructed prolapse preventing truss and a complemental applying and restraining harness therefor, a particular form of a uterus retaining truss which is expressly designed to prevent a farm animal, such as a cow, from everting the uterus through the vulva.

It is a matter of common knowledge to veterinarians and livestock breeders that cows, mares and other young-bearing animals are confronted with a condition involving a continuing strain called "Casting the Withers" shortly after parturition or calving. It is well known too, that an animal that has prolapsed the uterus may die quickly or if the prolapse is reduced and the uterus replaced by competent veterinary aid, the animal may suffer from infection, shock, trauma, loss of flesh and milk supply as well as possible sterility. Various types of mechanical aids and appliances have been contrived with a view toward coping with the stated condition all with varying degrees of success and endorsement.

The object of the instant invention is to structurally, functionally and otherwise improve upon prior art vulva supporting trusses and, in so doing, to provide a combined truss and harness in which veterinarians, livestock breeders, farmers and dairymen will find their respective requirements and needs fully met, contained and satisfactorily available.

Another object of the invention is to provide an overall structural adaptation wherein the harness means is simple, practical, easy to apply and remove, comfortable to the wearer and the truss is safe, sound and conformable to the contours of the animal's anatomy in the region of the tail, caudal folds, anal, vulva and perinal regions.

Briefly, the invention has to do with a uterus retaining truss adapted to prevent a farm animal from everting the uterus through the vulva comprising a brace having means whereby said brace may be held in operative association with the animal's vulva and having a crotch for retaining retention of the ventral commissure.

More specifically, the truss is in the form of a rigid V-shaped frame embodying upwardly and outwardly diverging limbs joined at their lower converging ends by a rounded axial bend, said limbs being longitudinally bowed, bent toward each other in close proximity to said bend and defining a constricted crotch and having terminal eyes at their free upper ends.

Other objects and advantages will become more readily apparent upon analyzing the following specification in conjunction with the various views appearing in the accompanying sheet of drawings.

In the accompanying drawings wherein like numerals are employed to designate like parts throughout the views:

Fig. 1 is a perspective view showing the improved truss in useful position on a cow and showing, in addition, the special harnessing means employed for applying and holding the truss where needed.

Fig. 2 is a rear elevational view of the truss by itself.

Fig. 3 is a side or edge elevation of the same.

Fig. 4 is a rear elevational view, fragmentary in type, showing certain modifications in the truss construction.

With reference now to Fig. 2 the truss is denoted, in a unitary sense, by the numeral 6. It resembles a large rigid wishbone and, specifically, it is generally V-shaped in form and preferably made from round rigid aluminum rods (also susceptible of being made of commercial plastic materials, wood, rubber and so on) which is approximately three-eights of an inch in diameter. The stated unit 6 may be referred to as a V-shaped frame and it comprises a pair of duplicate upwardly and outwardly diverging limbs 8 and 10 joined together at their converging ends by a rounded apical bend 12. The limbs adjacent the bend are bent inwardly opposite to each other at the points 14 and 16 and define a restriction 18. The latter and several bends define, in turn, a substantially U-shaped crotch 20 for retentive reception of the ventral commissure of the wearer's vulva. In side view, as shown in Fig. 3, the limbs are longitudinally bowed and the curvature is carefully planned and made to conform to the lateral and ventral surfaces of the vulva in order to provide maximum support and resistance to protrusion of the uterus. Considering Fig. 3 in connection with Fig. 1 it will be seen that the bends of the limbs comfortably fit and accommodate the natural contours of the tail head, caudal folds, anal, vulva and perinal regions. The upper free ends of the limbs are formed with straight portions 22 terminating in offset eyes 24 and 26.

In the modification seen in Fig. 4 the V-shaped frame or truss is denoted by the numeral 28, the limbs by the numerals 30 and 32, the apical bend is denoted at 34, the constriction bends at 36 and 38, the restriction at 40 and the crotch portion at 42. Here, the bend is made of components which are pivotally or hingedly connected together at 43. The arms are the same as already described except that each arm is provided at its intermediate portion with rigid angularly disposed braces or stays and these are overlapped and denoted by the numerals 44 and 46. They are adjustably connected together at 48. This form of the invention is, obviously, for adjustable adaptability and may be regulated according to any special conditions which are met by the veterinarian or other users.

The harness means shown in Fig. 1 comprises a neck encircling band or collar 48 and a pair of longitudinal back straps 50 (only one seen in Fig. 1). The central portions of the straps are crossed at 52 and the leading ends are joined with the collar at 54. The trailing or rear end portions are in divergent relationship as at 56 and connected with their respective eyes 24 and 26. The body and leg complemental straps are denoted by the numerals 58 and here again the intermediate portions are crossed over the back of the animal as at 60 and the forward portions 62 are connected at their leading ends as at 64 with the collar. A single strap is used and it is tied by a half-hitch as at 66 with the apical bend or crotch portion of the truss.

The truss is placed under the tail of the cow and applied with its concavity forward so as to conform to the contours of the animal's anatomy in that region. The two eyes on each end of the truss are on either side of the tail head with the arms of the appliance immediately lateral to the vulva in the space between the vulva and the pin bones. The ventral commissure or bottom tip of the vulva fits snugly into the base of angle of the truss. In this manner the uterus or vagina cannot be forced through the lips of the vulva as the arms of the truss will not spread or yield to permit passage. The truss is now retained in place by half-inch or three-eighth inch ropes or straps attached to each eye and the base of the truss. A length of rope about eight feet is sufficient for each eye and another length of about eighteen feet is needed to be threaded half its length through the base or angle of the truss and a simple single loop is tied about itself so as to include the truss at its base or apex; this leaves two ends of rope hanging from the bottom of the truss. A rope or collar is now tied or placed about the neck snugly and securely. The retainer has been fitted about the vulva and under the tail as described above. The rope from the eye of the truss at the left of the tail head is passed forward and across the backbone of the cow to the right side where it attaches to the collar on the right side of neck. Similarly the rope from the eye of the truss to the right of the tail head is passed forward and across the backbone to tie to the neck collar on the left side. Now one end of the rope that has been looped and tied about the angle of the truss is passed between the udder and the inside of the thigh of the right hind leg where it emerges at the right flank, passes upward and across the backbone of the animal to the left side where it is attached to the rope collar on the left side. In a like manner the other end of the rope from the bottom of the truss is passed between the side of the udder and inside the thigh of the left hind leg to emerge at the left flank where it is carried over the backbone of the cow to the right side and tied to the collar on the right side of the neck. Thus all four ends of rope from the truss attach to the collar after crossing over the back of the cow. These ropes are now adjusted at the collar and so as to firmly secure or anchor the truss in place about the outside and ventral surfaces of the vulva as described.

The appliance does not unduly irritate the cow and may be retained in place for a few days or until straining ceases or danger of eversion or prolapse has ceased. The device requires no watching, gives peace of mind, does not interfere with the normal separation of the afterbirth, or bladder and intestinal elimination.

The invention has to do with the truss specifically shown in Figures 2 and 3, the modification shown in Figure 4 and, in addition, with the combination of straps or ropes constituting the over-all harness means.

Minor changes in shape, size, materials and rearrangement of parts may be resorted to in actual practice provided no departure is made from the invention as claimed.

Having described the invention, what is claimed as new is:

1. A uterus retaining truss adapted to prevent a farm animal from everting the uterus through the vulva comprising a rigid V-shaped frame embodying upwardly and outwardly diverging limbs joined at their lower converging ends by a rounded apical bend, said limbs being longitudinally bowed, bent toward each other in close proximity to said bend and defining a constricted crotch and having terminal eyes at their free upper ends.

2. The structure defined in claim 1, wherein said converging portions of said limbs are pivotally connected and the median portions of the respective limbs are connected by adjustable stay means.

3. The structure defined in claim 1 and a harness comprising a neck encircling collar, a pair of back straps crossed at their central portions and fastened at their leading ends to said collar and at their trailing ends to said eyes, and a pair of companion body and leg straps also centrally crossed and likewise connected at their leading ends to said collar and at their trailing ends to said apical bend.

4. A uterus retaining truss adapted to prevent a farm animal from everting the uterus through the vulva comprising a bracing frame having means whereby it may be harnessed and sustained in operative association with the wearer's vulva, having a ventral commissural crotch and limbs to contact and support the over-all vulva and perineal regions while, at the same time, conforming in general contour thereto and straddling the anal and caudal fold regions, said frame being approximately V-shaped, said limbs being longitudinally bowed, and the free ends of said limbs being provided with eyes adapted to occupy positions on opposite sides of the tail head of the wearer.

JEROME PAYTON.

REFERENCES CITED

The following references are of record in the file of this patent:

UNITED STATES PATENTS

| Number | Name | Date |
| --- | --- | --- |
| 197,050 | Nichols | Nov. 13, 1877 |

FOREIGN PATENTS

| Number | Country | Date |
| --- | --- | --- |
| 38,647 | Denmark | Apr. 10, 1928 |
| 79,449 | Germany | Feb. 6, 1895 |
| 368,022 | France | Nov. 15, 1906 |